United States Patent Office 3,676,171
Patented July 11, 1972

3,676,171
POLYVINYL CHLORIDE POWDER COATINGS
Lester L. Spiller and Claude W. Buford, Indianapolis, Ind., assignors to Ransburg Electro-Coating Corp., Indianapolis, Ind.
No Drawing. Filed Nov. 16, 1970, Ser. No. 90,061
Int. Cl. B44d 1/094; B05b 5/00
U.S. Cl. 117—17                                    22 Claims

ABSTRACT OF THE DISCLOSURE

Polyvinyl chloride homopolymer powder which is substantially free of copolymerizable monomers which will soften the polymer or increase its solubility in organic solvents so that it does not fuse to form a film when heated in the absence of pressure is fused and coalesced into a continuous non-porous film by subjecting a layer of the powder on a substrate to organic solvent vapor having a temperature in excess of 100° C. while condensing the solvent vapors on the substrate until the film is formed.

The present invention relates to powder coating using polyvinyl chloride homopolymer.

Powder coating is well known using resin powders which fuse with heat. It is also known that thermoplastic powder coatings can be fused using solvent vapor at low temperature. However, neither of these techniques is applicable to polyvinyl chloride homopolymers which, as is well known, degrades when exposed to elevated temperatures and which is relatively intractable in organic solvents despite possessing some limited solubility therein. As a result, polyvinyl chloride applied from organic solvent medium is normally employed as a copolymer containing copolymerized vinyl acetate which degrades the physical and chemical resistance of the polymer. Polyvinyl chloride is also used together with softening and flexibilizing plasticizers such as dioctyl phthalate and the like, but here the plasticizer degrades the physical and chemical resistance of the polymer.

Polyvinyl chloride homopolymer itself cannot be used in ordinary powder coating because when the powder is heated in an effort to fuse the same at a temperature of from 165–290° C., the result is always a powdery char.

If the polyvinyl chloride homopolymer is plasticized with the conventional ester plasticizers, then the plasticized powder will fuse to form a film on a base. However, the film is soft and highly sensitive to solvents and the adhesion to metal, e.g., mild steel, is very poor. Indeed, when impacted with a 1 inch pound of forward impact, the coating separated from the base.

We have tried to fuse powder coatings of unplasticized polyvinyl chloride homopolymer using methylene chloride (dichloromethane), acetone or methyl ethyl ketone vapors, but this has not been successful. The methylene chloride did not effectively fuse the powder. The two ketones caused the formation of a film, but the action was unacceptably slow and the film is rough and flow is poor.

Accordingly, and to the present time, the effective use of unplasticized polyvinyl chloride homopolymer in powder coating technology represents a long sought goal which has never been obtained. Indeed, and to obtain powder coatings to protect pipes, for example, expensive epoxy powder systems have been required and these cure to brittle materials which can crack when impacted as an incident to installation to produce a holiday where corrosive forces can concentrate via, for example, galvanic action.

In the present invention, the object to be coated has appled thereto a layer of polyvinyl chloride homopolymer powder representative of a poorly soluble resin which does not fuse to form a film by the application of heat without pressure. This object, with the powder layer thereon, is subjected to the action of an organic solvent vapor having a temperature in excess of 100° C., preferably in excess of 115° C. The object is at a temperature, such as room temperature, which is below the temperature of the solvent vapor to cause limited condensation on the substrate. In this way, the poorly soluble, heat-intractable resin powder is subjected to very hot organic solvent vapor while the solvent vapors condense on the substrate. Thus, the resin powder is subjected simultaneously to hot organic solvent vapor and condensing liquid, and this causes the powder particles to fuse, coalesce, and form a continuous non-porous film. In an important feature of this invention, a film of polyvinyl chloride homopolymer powder is formed which is adherent to metal surfaces including primed and unprimed steel. The result is a reasonably adherent film constituted by polyvinyl chlorides as the essential resin component which is hard, possesses at least some limited solvent resistance and, in some instances on cleaned mild steel, sufficient impact resistance is developed to pass 32 inch/pounds of forward impact (Gardner Impact Tester).

The solvent may be any organic material in which polyvinyl chloride is soluble and which boils above about 100° C., to form a condensable vapor at the selected temperature of operation. The operating temperature will normally not exceed 300° C., and preferably will not exceed 200° C. The solvent may be inert (non-reactive), in which case preferred solvents are ketones boiling above 100° C., illustrated by pentoxone (4-methoxy-4-methyl pentanone-2) and dibutyl ketone. Lower boiling stronger solvents such as tetrahydrofuran, or methyl ethyl ketone may be included in small amounts to improve the speed of film formation. Similarly, a small amount of dimethyl sulfoxide may be used for the same purpose. These stronger solvents enable a slight reduction in the minimum temperature, but they introduce complications from the standpoints of toxicity and criticality of operating conditions.

As a feature of this invention, the solvent, instead of being a non-reactive liquid boiling above about 100° C., such as the high boiling ketones noted, is selected to be a similarly high boiling unsaturated monomer having solvent activity, such as styrene, vinyl toluene, methyl methacrylate or the like. Styrene and vinyl toluene are particularly preferred since these have greater solvency than methyl methacrylate. Despite the high temperature of application (100° C. or higher), these unsaturated monomers can be inhibited to prevent polymerization in the liquid phase (during boiling of the monomer to provide the needed vapor), whereas the unsaturated monomer in vapor form is substantially free of inhibitor to permit polymerization at the time of deposition by condensation or absorption in the exposed resin powder. Polymerization may also take place during an optional baking operation which may be carried out after the desired film is formed.

Any relatively nonvolatile inhibitor for addition polymerization can be utilized in order to prevent the unsaturated monomeric solvent from polymerizing when the liquid monomer is boiled to generate the desired vapors. Sulfur is an effective polymerization inhibitor for the purpose named and will be used to illustrate the concept. The sulfur is desirably used in an amount of 0.1 to 0.5% of the weight of the unsaturated monomer. 1,4-benzoquinone will further illustrate the concept because its concentration in the vapor phase is minimal.

Another feature of solvent selection is the utilization of a mixture of solvents in which part of the solvent mixture is an unsaturated polymerizable monomer of the type described and part of the solvent mixture is a non-polymerizable (non-reactive) solvent having a boiling point higher than the boiling point of the polymerizable monomer. The utilization of polymerizable and higher boiling non-polymerizable solvents in admixture with one another enables unsaturated solvents to be used at temperatures above their normal boiling point. This apparently increases the opportunity for the unsaturated solvent to polymerize as it is deposited, directly providing films having superior solvent insolubility and reducing the need for subsequent cure (as by baking).

It is also helpful to employ in the solvent mixture discussed hereinbefore a mixture of unsaturated monomers, part of the unsaturated monomer being a vinyl aromatic compound such as styrene or vinyl toluene and a second part of the unsaturated monomer being an acrylic monomer such as methyl methacrylate. Indeed, mixtures of styrene or vinyl toluene with methyl methacrylate in weight ratio mixtures of from 4:1 to 1:4 are particularly attractive in combination with a high boiling ketone such as pentoxone since, in this way, the polyvinyl chloride film which is produced is very smooth and exhibits good adhesion with high impact resistance.

The invention is specifically limited to resins like polyvinyl chloride homopolymers which, in powder form, will not fuse on the application of heat in the absence of pressure. This requires that the polyvinyl chloride polymer be substantially free of copolymerizable monomers which will soften the polymer or increase its solubility in organic solvents. On this basis, preferred polymers would include at least about 90% and preferably at least about 98% by weight of polymerized vinyl chloride and, of the other monomers which may be present, vinyl acetate would typify the least desirable material since vinyl acetate greatly increases the solubility and decreases the physical properties of the polymer. Other monomers which may be present without significantly altering the essentially homopolymeric character of the vinyl chloride polymer are ethylenic acids such as fumaric acid, itaconic acid, crotonic acid, methacrylic or acrylic acids, vinylidene chloride, acrylonitrile, methyl methacrylate and the like. The polyvinyl chloride homopolymer may be provided in any desired fashion as by emulsion polymerization or by polymerization in suspension or in bulk and the molecular weight of the polymer is of secondary consideration since the invention is applicable to polymers which might be regarded as having either high, medium, or low molecular weights.

The polyvinyl chloride powder may contain a proportion of polymerizable monomer so long as the polyvinyl chloride homopolymer containing the absorbed monomer is still incapable, in powder form, of fusing upon the mere application of heat. Thus, the polyvinyl chloride homopolymer powder may contain absorbed monovinyl aromatic compound such as styrene, vinyl toluene, or methyl methacrylate, or a polyacrylate or polymethacrylate such as 1,4-butylene dimethacrylate, or epoxy, polyacrylates, or methylacrylates. The absorbed material may include peroxy polymerization catalysts and the like, as well as conventional stabilizers for polyvinyl chloride, to facilitate polymerization either during film formation at elevated temperature as contemplated herein or in some subsequent baking operation, or both. Monomers which, in polymerized form, do not soften the polyvinyl chloride homopolymer are preferred. These are known as hardening monomers.

When polyethylenic monomers are absorbed in the polyvinyl chloride homopolymer particle, and especially if the coated article with the fused film thereon is baked following solvent fusion in elevated temperature solvent vapor, then solvent resistance and film toughness can be further enhanced.

The substrate must be below the boiling point of the solvent system used to cause condensation, desirably at least 10° C. below the temperature of the vapors to which it is subjected at which the solvent or solvent mixture is boiled. To avoid excessive condensation which forces the rapid removal of the substrate from the solvent vapors, the substrate should be preheated so that, when the substrate with the powder layer thereon is subjected to the solvent vapor, the substrate temperature will be not more than about 25° C. below the temperature of the vapors. Preferably, the solvent vapors should be essentially saturated since significant superheating of the vapors may prevent contact between the vapors and the cooler substrate from causing the desired condensation. Also, the substrate may be used without preheating, in which event, it must be withdrawn from the solvent vapors before excessive condensation occurs, which is practical, though less desirable.

The time of deposition of the solvent vapor may vary considerably from about 10–80 seconds, preferably from 20–60 seconds. Exposure to the solvent vapor cannot be continued indefinitely for, after the film has been properly formed, it will degrade upon prolonged exposure.

After the powder has been freshly fused, it is preferred to permit any volatile solvents to volatilize. Indeed, in normal circumstances, the high boiling solvents used herein will vaporize on simple exposure to the air for about 30 minutes, leaving a surface dry to the touch. The film so-produced can be further air dried, which normally requires from 12–24 hours. Also, the fresh films can be force dried to the touch by blowing air thereon at 50–90° C., which takes from about 1 to 5 minutes. Cure can be enhanced by subjecting a coating which is dry to the touch to baking temperatures of from 150–300° C. for periods of time of from 30 seconds at the highest temperature to about 30 minutes or longer at the lower temperature.

In the handling of the present invention, the powder layer can be formed and maintained in any conventional manner while the high temperature solvent vapors are permitted to condense on the substrate to cause the powder particles to fuse and coalesce to form the continuous non-porous film. In preferred practice, the substrate is metallic or otherwise rendered conductive and electrostatic force is used to deposit the powder particles on the substrate. These powder particles will remain electrostatically associated with the substrate for a considerable length of time, permitting the metal substrate to be immersed in a bath of the hot organic solvent vapors. The electrostatic application and adhesion of the powder particles to a metal substrate is well known.

While the present invention is particularly directed to the production of coatings which are reasonably adherent to the metal surface on which they are deposited, it will be appreciated that the substrate can be treated to deliberately negate adhesion as by the deposition of a film of oil or wax thereon and especially by the deposition of a methyl silicone oil so that the film which is produced in accordance with the invention is easily stripped from the supporting substrate. In this way, one can form free films, including continuous sheets, or, if the substrate is configurated, one can form thin walled shaped products conforming to the shape of the substrate on which the deposition is effected.

While minimum temperatures have been stressed heretofore, since these are critical, it is desired to point out that so long as the solvent vapor is utilized under conditions providing condensation which is achieved by having the substrate at a temperature below the boiling point of the liquid used to form the vapor, that the upper limit of temperature is not a prime feature of the invention. Of course, there is a limit as to how much elevated temperature can be sustained by the polyvinyl chloride powder, which is the charring or scorching temperature of the powder, and such temperatures should be avoided.

EXAMPLE

Polyvinyl chloride homopolymer powder (average particle size 75–100 microns) is electrostatically sprayed onto a degreased mild steel test panel (4" x 5"). The panel, containing the powder in the form of a layer electrostatically adhered to the panel at room temperature, is then immersed into a vapor bath for 40 seconds, though the time of immersion may range from 20 to 60 seconds with good results. Also, the powder layer may vary in thickness from about 1 to 20 mils with good results.

The composition of two useful vapor baths is as follows:

Bath #1—Pentoxone—boiling range 147–163° C.
Bath #2—1:1 mixture of Styrene and Methyl Methacrylate—boiling range 119–140° C.

The coated panel carrying the film of freshly fused powder is allowed to flash for 30 minutes. In general, flash drying is complete when the surface is dry to the touch. After the fused film is dry to the touch, it is force dried for 5 minutes at 150° C. Alternatively, the film may be air dried for 12–24 hours. The force dry method is preferred because of the rapid dry time.

When a 7 mil powder layer is immersed in Bath #1, the film produced is very smooth, substantially continuous and has a substantially uniform thickness of about 5 mils. The thickness of the film will vary with the thickness of the powder layer which is fused. Smooth and continuously coated panels are successfully produced using each of Baths #1 and #2, but Bath #2 yielded coatings of increased hardness, better abrasion resistance, improved solvent resistance and better impact resistance. Indeed, the coated panel made using Bath #2 withstands 32 in./lbs. of impact (Gardner Impact Tester) without any cracks, breaks, or interruptions in the film. Using Bath #1, the coatings are good, though less outstanding than are produced using Bath #2. It is noted in passing that Bath #1 produces fair acetone resistance which is quite good even though this is normal for polyvinyl chloride. It is also possible to improve the result obtained using Bath #1 alone by immersing the panel in Bath #1 and Bath #2 in sequence.

A commercial polyvinyl chloride which may be used in this example to produce the indicated results in Diamond PVC Grade 33 available from Diamond Alkali Company of Cleveland, Ohio. Attempts to fuse this same polyvinyl chloride homopolymer powder without plasticizer using temperatures ranging from 165–290° C. were made, but the resulting product in each instance was a powdery char.

When this same polyvinyl chloride homopolymer powder is plasticized with conventional softening plasticizers such as dioctyl phthalate (20% by weight of the polymer) and fused at 450–500° F., it forms a smooth continuous film. However, the film is soft, 2B to B hardness instead of H to 2H as is typical of the invention, and the acetone resistance falls off badly. Moreover, there is very little adhesion to the mild steel panel (fails 1 in./lbs. of impact).

The example is repeated using another commercial polyvinyl chloride homopolymer powder QSAP-7 sold by Union Carbide Corp., Texas City, Tex. The same results are obtained.

Repeating the example by preheating the panel to a temperature of 20° C. below the temperature of the vapors in the vapor bath made the film forming action more rapid and less subject to film degradation upon excessive immersion.

In the experiments referred to, the polyvinyl chloride powder was applied using Ransburg Powder Gun Model 322 AC associated with a non-rotating flat spray nozzle. The gun was powered by Ransburg Model 231 BA power supply having a maximum voltage of 100 kv. (D.C.) and a short circuit current of 200 microamperes. Of course, electrostatic powder coating is well known and the specific equipment referred to need not be used. Moreover, the invention is not restricted to electrostatic depositing since the powder can be dusted on a horizontal surface or otherwise applied.

The invention is defined in the claims which follow.

We claim:

1. A method for the production of films from polyvinyl chloride powder containing at least 90% of polymerized vinyl chloride and which is substantially free of copolymerizable monomers which will soften the polymer or increase its solubility in organic solvents so that it does not fuse to form a film when subjected to heat in the absence of pressure comprising, depositing a layer of said powder on a supporting substrate, and subjecting said powder layer on said substrate to the action of organic solvent vapor having a temperature in excess of 100° C., said substrate having a temperature below the temperature of said vapor to cause condensation of solvent vapor on said substrate whereby said powder layer is subjected simultaneously to hot organic solvent vapor and condensing liquid to cause the powder particles to fuse and coalesce into a continuous non-porous film.

2. A method as recited in claim 1 in which said solvent vapor is essentially saturated.

3. A method as recited in claim 1 in which said organic solvent vapor has a temperature in excess of 115° C.

4. A method as recited in claim 1 in which said organic solvent comprises a high boiling ketone.

5. A method as recited in claim 4 in which said ketone is pentoxone.

6. A method as recited in claim 1 in which said organic solvent comprises a high boiling unsaturated monomer.

7. A method as recited in claim 6 in which said unsaturated monomer is boiled in the presence of a substantially non-volatile polymerization inhibitor to provide said solvent vapor.

8. A method as recited in claim 6 in which said unsaturated monomer is selected from the group consisting of styrene, vinyl toluene and methyl methacrylate.

9. A method as recited in claim 8 in which said organic solvent vapors are a mixture of styrene or vinyl toluene and methyl methacrylate.

10. A method as recited in claim 1 in which said substrate is preheated to a temperautre of from 10–25° C. below the temperature of said vapors.

11. A method as recited in claim 1 in which said polyvinyl chloride homopolymer contains at least 98% by weight of polymerized vinyl chloride and is substantially free of plasticizers which would enable the powder to fuse when subjected to heat in the absence of pressure.

12. A method as recited in claim 11 in which said polyvinyl chloride homopolymer powder has absorbed therein a polymerizable monomer.

13. A method as recited in claim 12 in which said polymerizable monomer is absorbed together with a peroxy polymerization catalyst.

14. A method as recited in clami 12 in which said polymerizable monomer is selected from the group consisting of monovinyl aromatic compound, methyl methacrylate, or a polyacrylate or polymethacrylate.

15. A method as recited in claim 1 in which said powder layer is subjected to said solvent vapor for a period of from about 10–80 seconds.

16. A method for powder coating metal substrates with polyvinyl chloride homopolymer powder which is substantially free of copolymerizable monomers which will soften the polymer or increase its solubility in organic solvents so that it does not fuse to form a film when subjected to heat in the absence of pressure comprising, electrostatically adhering said powder to said metal substrate to form an adherent powder layer thereon, immersing said substrate with said powder layer adhered thereto into a bath of essentially saturated organic solvent vapor having a temperature from 100–300° C., said substrate having a temperature of at least 10° C.

below the temperature of said vapor to cause condensation of solvent vapor on said substrate whereby said powder layer is simultaneously subjected to hot organic solvent vapor and condensing liquid to cause the powder particles to fuse and coalesce into a continuous non-porous film, and removing said substrate with said film thereon from said bath.

17. A method as recited in claim 16 in which said organic solvent is a polymerizable ethylenically unsaturated monomer supplied in hot vapor form by boiling said monomer in the presence of a substantially non-volatile inhibitor.

18. A method as recited in claim 17 in which said organic solvent comprises a mixture of styrene and methyl methacrylate.

19. A method as recited in claim 16 in which said monomer is boiled in admixture with a higher boiling non-polymerizable organic solvent.

20. A method as recited in claim 16 in which said polyvinyl chloride homopolymer powder contains absorbed polyacrylate or polymethacrylate.

21. A method as recited in claim 16 in which said polyvinyl chloride homopolymer powder contains absorbed free radical generating catalyst.

22. A method as recited in claim 16 in which said substrate is immersed in said bath for a period of from about 20 to about 60 seconds.

References Cited

UNITED STATES PATENTS

| | | | |
|---|---|---|---|
| 3,288,624 | 11/1966 | Clark | 117—21 |
| 2,735,784 | 2/1956 | Greig et al. | 252—62.1 |
| 3,090,755 | 5/1963 | Erchak et al. | 252—62.1 |
| 3,093,039 | 6/1963 | Rheinfrank | 252—62.1 |
| 3,502,582 | 3/1970 | Clemens et al. | 252—62.1 |
| 2,677,622 | 5/1954 | Shouteden | 117—21 |
| 3,502,492 | 3/1970 | Spiller | 117—21 |
| 3,565,665 | 2/1971 | Stranch et al. | 117—21 |
| 3,532,530 | 10/1970 | Denison et al. | 117—21 |
| 3,285,864 | 11/1966 | Abell et al. | 117—21 |

FOREIGN PATENTS

| | | | |
|---|---|---|---|
| 1,166,104 | 10/1969 | Great Britain | 117—21 |

WILLIAM D. MARTIN, Primary Examiner

M. SOFOCLEOUS, Assistant Examiner

U.S. Cl. X.R.

117—21, 63, 106 R, 161 UF